Oct. 9, 1945. C. F. WALLACE 2,386,643
PRECISE LEVEL DETERMINATION APPARATUS
Filed Sept. 14, 1944
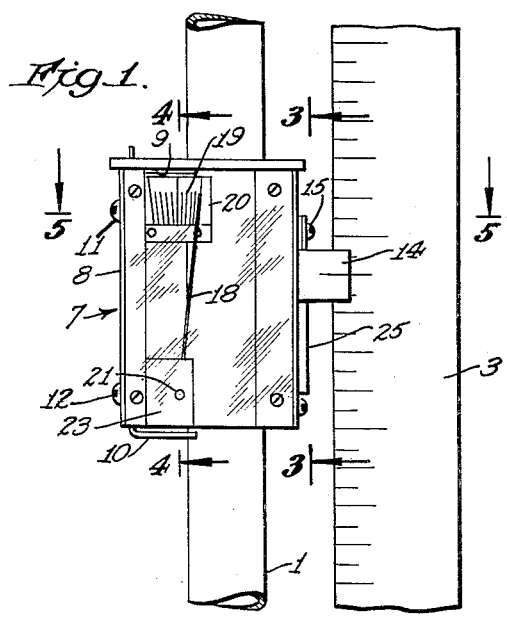
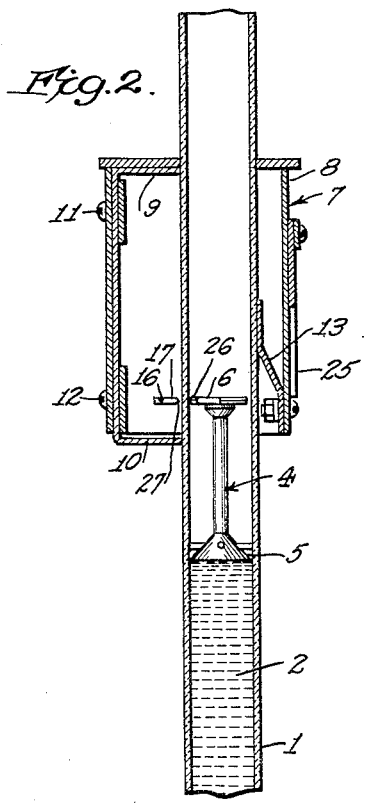
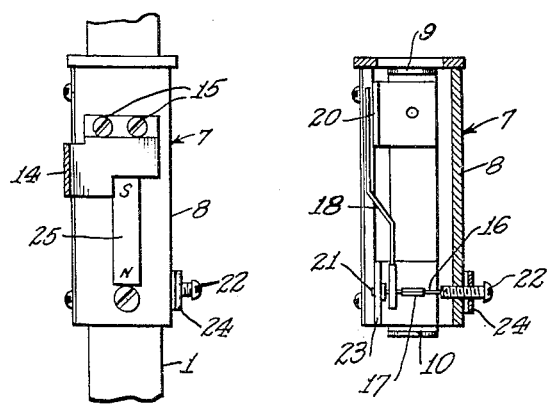
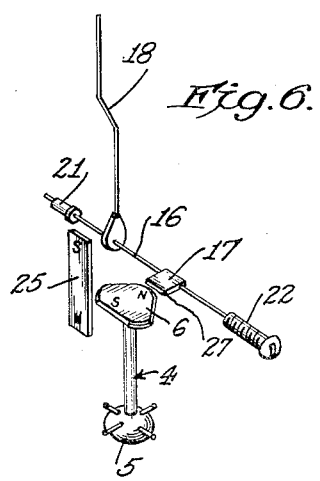
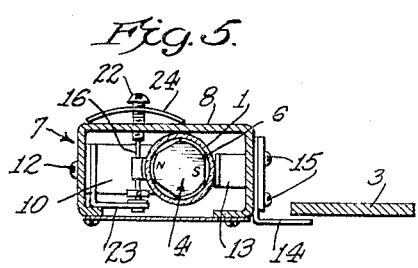
INVENTOR.
CHARLES F. WALLACE
BY
John C. Kerr
ATTORNEY Patented Oct. 9, 1945

2,386,643

UNITED STATES PATENT OFFICE 2,386,643

PRECISE LEVEL DETERMINATION APPARATUS

Charles F. Wallace, Westfield, N. J., assignor to Wallace & Tiernan Products, Inc., Belleville, N. J., a corporation of New Jersey Application September 14, 1944, Serial No. 554,097

8 Claims. (Cl. 73—314)

The present invention relates to apparatus by which the level of a liquid may be precisely determined. Such apparatus may be of great importance for example in manometers of various types and particularly in mercury barometers. The invention is not, however, limited to apparatus of this kind, but may be used wherever it is desired to determine the level of a liquid in a tube such for example as a sight glass associated with a tank, the level of the liquid in which is to be determined. Furthermore, while many embodiments of the invention include transparent tubes, the invention from a broad joint of view is not limited in this manner, but is applicable even with opaque tubes of many desired types of material.

One of the difficulties which has been experienced, especially by unskilled operators, in the use of instruments or apparatus of the types above generally set forth, for example mercury manometers, is to obtain readings which will be not only accurate, but wherein extremely fine readings are desired of the height of the liquid column, for example, a mercury column. This is more important with relatively unskilled persons, but also presents a very real problem, even with a skilled operator where precise accuracy is desired.

My present invention provides apparatus by which the height of a liquid column, such for example as a mercury column, may be determined with great accuracy, such for example, as a reading, accurate to about 0.01 millibar in measuring pressures of the order of atmospheric pressure.

A more specific object of the present invention is to provide apparatus by which a relatively coarse reading of the height of a liquid column may be obtained by a visual reading thereof in respect to a scale associated therewith and usually arranged substantially parallel with the liquid column, the height of which is to be read, and to provide magnetic type apparatus, including a member floating in the liquid, and magnetic means associated therewith, by which a very fine reading may be obtained, the two readings taken together constituting the entire reading of the height of the liquid column.

Other objects and advantages of the present invention will become apparent from the following specification and appended claims when taken in connection with the accompanying drawing, in which:

Figure 1 is a fragmentary view in elevation, showing a portion of an apparatus embodying the present invention;

Fig. 2 is a view substantially in vertical central section of many of the parts of Fig. 1;

Fig. 3 is a fragmentary view, principally in elevation, and with a part in section on the line 3—3 of Fig. 1;

Fig. 4 is a view principally in vertical transverse section on the line 4—4 of Fig. 1;

Fig. 5 is a view substantially in horizontal section on the line 5—5 of Fig. 1; and Fig. 6 is a more or less diagrammatic view in perspective, illustrating the operation of the magnetic portions of the apparatus.

I have chosen to show, for purposes of illustration, only a small portion of an apparatus embodying the present invention, the drawing illustrating a tube 1 which may be of glass, but which may also be formed of other materials including such opaque materials as certain metals and in which there is a liquid 2, the level of which is to be determined. The liquid 2 in most instances will be mercury, but I do not wish to be limited in this respect as the invention is applicable to the precise determination of the levels of other liquids. Associated with the tube 1 is a scale 3 having suitable graduations thereon. As shown this scale is separate from the tube and is provided adjacent thereto and substantially parallel therewith.

In the prior art it has been customary merely to sight across the level of a liquid in a tube having, for example, a mercury column therein onto a scale and to read the top of the meniscus. However, for the purposes of the present invention, I prefer to provide a floating element generally indicated at 4 and then to determine the level of the upper portion of this element in a manner more specifically hereafter set forth, the height and graduations of the markings on the scale 3 being suitably disposed to compensate for the height of the floating element above the ordinary level of the liquid 2.

As shown, the floating element 4 comprises a lower portion 5 of generally conical shape adapted to float on the liquid 2 in the tube 1 and an upper portion 6 formed as a flat disk which is non-circular in contour and may be described as generally triangular but with rounded corners approaching the inside walls of the tube 1 as particularly shown in Fig. 5. It is to be understood that the member 4 is of such diameter that it may float freely on the liquid 2 with little or no friction in respect to the inside of the tube 1, so that the upper portion 6 thereof will register a level truly representative of the level of the liquid 2. While it may be possible by visually sighting across the top surface of the portion 6 of the floating element to determine the level by comparison with a suitably disposed scale and thus to obtain a coarse reading of the desired level, it is preferred to provide means by which fine readings of this level may be obtained for use either in conjunction with the coarse readings above referred to, or in a manner hereinafter described, as the entire reading. This latter operation is particularly applicable, and in fact necessary, when a non-transparent tube 1 is used.

To accomplish this purpose there is provided on the outside of the tube 1 a supporting member generally indicated at 7. This supporting member may be constructed as a box-like frame 8 having upper and lower contact portions 9 and 10 respectively for engaging one side of the tube 1, these portions being suitably secured as by screws 11 and 12, respectively, to the frame 8. Also secured to the frame 8 is a resilient leaf spring 13 (Fig. 2) adapted to bear upon the opposite side of the tube 1 from that in engagement with the portions 9 and 10 and to retain the supporting structure 7 in any desired vertically placed position on the tube.

In order that the indicating means within the supporting member 7 may be read as suitable fractions of the coarse reading which may be obtained, as above set forth, by direct visual comparison between the upper portion 6 of the floating element 4 and the graduations of the scale 3, means are provided to enable the supporting member 7 to be positioned vertically along the tube 1 in an exact desired position in respect to the graduations of the scale 3. For this purpose the frame 8 has secured thereto an index member 14 preferably having a single index mark thereon, as shown, and cooperable with the graduations of the scale 3, as best seen in Figs. 1 and 5. The index member 14 may be secured to the frame 8 by a pair of screws 15 and may be provided with suitable means of a known type, preferably vertically elongated screw holes (not shown) in the bracket carrying the member 14 through which the screws 15 pass to permit of a vertical set-up adjustment between the member 14 and the supporting means 7. This adjustment once made is secured by tightening the screws 15.

In some cases it may be desired to use a scale having a plurality of unit graduations instead of the single index mark, as in this way it is unnecessary to graduate the scale 3 as finely. If this is done the scale 14 is preferably made interchangeable, so, for example, if a different scale 3 is used, the graduated scale replacing the index member 14 may be correspondingly interchanged to cooperate with the scale graduations upon the replaced scale 3. This difficulty of interchange may, however, be avoided by providing suitable fine graduations upon the scale 3 and using but a single index mark on the member 14, as shown.

In order to obtain a precise reading of the level of the liquid 2 in the tube 1, the upper portion 6 of the float 4 is preferably permanently magnetized. As shown best in Fig. 6 one pole of this magnet such as the north pole, as illustrated, is disposed toward one of the rounded points of the triangular form, while the other (south) pole is disposed toward an opposite flat side thereof which, in the normal use of the device, is disposed at a relatively greater distance from the inside of the tube 1 than the north pole.

Within the supporting member 7 and arranged for free rotation about a horizontal axis is a shaft 16. This shaft carries an armature 17 of magnetic material, such as soft iron, which is adapted to be attracted by the magnetized upper end 6 of the float 4. The shaft 16 also carries an index pointer 18 cooperable with a scale 19 suitably formed on a member 20, which may be suitably secured as by the screw 11 to the inside of the frame 8. The member 20 may, if desired, be removable and interchangeable as set forth above in connection with the index member 14. The shaft 16 is journaled in substantially frictionless bearings, preferably jewels, carried by a stud 21 and a screw 22. The stud 21 may be suitably held in a bracket 23, which is in turn held in the frame 8 by the screw 12; and the screw 22 may be threaded through the frame 8 and prevented from undesired rotation in respect thereto by a flexible spring member 24, in a manner well known in the art.

In order that the control of the index pointer 18 by the permanently magnetized portion 6 be made very sensitive and accurate, it is desired that the pole of the permanent magnet arranged to cooperate with it be as close to it as possible. For this reason, means are provided for automatically rotating or orienting the floating member 4 about its vertical axis, which is substantially the same as the vertical axis of the tube 1, to bring the pole designated N to a position adjacent to the armature 17. For this purpose there is provided outside the frame member 8 a permanent magnet 25, which may have its north pole at its lower end and its south pole at the upper end thereof, as diagrammatically illustrated in Fig. 6. This magnet 25 is preferably only sufficiently strong and is located so far from the permanently magnetized portion 6 that it will serve only to rotate the floating element 4 about a vertical axis to orient the desired (north) pole thereof toward the armature 17. For this purpose it will be noted that the other (south) pole of the magnetized member 6 is spaced some distance from the wall of the tube as is also the magnet 25. The magnet 25 will also, however, prevent the magnet 6 from drawing itself so closely toward the armature 17 as to introduce any substantial amount of friction tending to hinder the floating element 4 from being moved to a level truly representative of the level of the liquid 2 in the tube 1.

Furthermore, in order that the readings to be obtained will be of the desired precision, the top portion 6 of the floating element 4 has its rounded corners, or at least that one constituting the north pole of the magnet, sharpened to a horizontally disposed substantial knife edge, as shown at 26 (Fig. 2). The armature 17 is also provided with a knife edge portion 27 extending toward the knife edge 26, so as to concentrate the magnetic flux path between these two elements.

It will be understood that while the tube 1 need not necessarily be of glass, it will be of non-magnetic material and will offer little appreciable resistance to the flow of magnetic flux therethrough. The weight of the parts carried by the shaft 16 being very little and the mounting thereof being almost frictionless, the index pointer 18 will follow very closely the position dictated by the magnetic association between the permanently magnetized portion 6 and the armature 17. A fine or precise reading of the liquid level may, therefore, be obtained directly from the scale 19, it being assumed that the index member 14 is so adjusted with respect to the supporting member 7 that the reading of the scale 19 by visual comparison with the index member 18 may preferably be taken as predetermined fractions of the smallest divisions of the scale markings on the scale 3. In this way, for example, it is possible to have the entire scale range of the scale 19 correspond to one millibar for reading pressures in the order of an atmosphere. If then the scale 3 is graduated down to single millibars, the supporting member 7 may be manually moved vertically until the single index mark of the member 14 is on the nearest millibar to the desired level which may be ascertained by the index pointer 18 being magnetically controlled. The decimal fractions of millibars down to about 0.01 millibar may then be read directly from the scale 19. It will further be understood that even though the tube 1 is of opaque material, the level of the liquid therein may nevertheless be determined by sliding the supporting member 7 vertically until the index pointer 18 is positively under the magnetic control of the permanently magnetized portion 6. At this time even though the magnet 6 starts in an improper or undesired rotated position about its own vertical axis, such position will be almost instantly corrected by the reaction with the magnet 25 which is conveniently carried by the supporting member 7 as shown. The entire level reading may then be quickly and precisely made with much greater accuracy than could be obtained using prior art devices.

While there is shown and described herein but one preferred embodiment of this invention, it will be understood that various modifications, including those specifically suggested, may be made therein without departing from the spirit of the invention, as set forth in the appended claims, which are to be construed validly as broadly as the state of the prior art permits.

What I claim is:

1. Apparatus for the precise determination of the level of a column of liquid in a tube having a scale associated with said tube, comprising an element constructed and arranged to float in the liquid in said tube, said element having a portion at least which is permanently magnetized, a supporting member slidably mounted outside of said tube for manual movement therealong, an index member secured to said supporting member and cooperable with said scale, means pivotally mounted in said supporting member and including an armature of magnetic material cooperable with the permanently magnetized element, an index pointer constructed and arranged to be moved by said pivotally mounted means, and a second scale on said supporting member and visually cooperable with said index pointer 2. Apparatus for the precise determination of the level of a column of liquid in a transparent tube having a scale associated therewith, comprising an element constructed and arranged to float in the liquid in said tube, and visually cooperable with said scale for enabling coarse readings of the level of the floating element and hence the height of the column of liquid in said tube to be made, said element having a portion at least which is permanently magnetized, and means for obtaining fine readings of the level being determined, including a supporting member slidably mounted outside of said tube for manual movement therealong, an index member secured to said supporting member and cooperable with said scale so that said supporting member may be manually adjusted to a desired position in respect to said first named scale, means pivotally mounted in said supporting member and including an armature of magnetic material cooperable with the permanently magnetized floating element, an index pointer constructed and arranged to be moved by said pivotally mounted means, and a second scale on said supporting member and visually cooperable with said index pointer for enabling fine readings of the height of the liquid column in said transparent tube to be directly made when the index on said supporting member is positioned as aforesaid with respect to the first named scale and said armature is influenced by said magnetized element to control the position of said index pointer.

3. Apparatus for the precise determination of the level of a column of mercury contained in a transparent tube and having a vertical scale associated with said tube by which coarse readings of the level of the mercury column may be determined, comprising an element constructed and arranged to float on the mercury in said tube and having one portion adapted to be in contact with and floating in the mercury and another portion spaced above and connected rigidly to the first named portion and the level of the second named portion being visually readable on said scale to give a coarse reading of the level of the mercury column in conjunction with said scale, and means for obtaining a fine reading of said level including a supporting member slidably mounted outside said tube and having an index member secured thereto cooperable with said scale, means pivotally mounted in said supporting member including an armature of magnetic material and an index pointer, a permanent magnet forming a part at least of said other portion of the floating element and cooperable with said armature, and scale graduations on said supporting member for visual association with said index pointer to enable a fine determination of the level of the mercury column to be made when said supporting member is moved to a vertical position on said tube such that said armature is influenced by said permanent magnet to control the position of said index pointer.

4. Apparatus in accordance with claim 1, wherein means are provided for manually adjusting said index member in respect to said supporting member as a set-up adjustment, the several scales being so graduated that when this set-up adjustment is made, the readings on the second named scale may be taken directly as predetermined fractions of the coarse readings obtained from the first named scale.

5. Apparatus in accordance with claim 1, wherein said pivotally mounted means is provided with anti-friction bearings for substantially frictionless rotation in said supporting member about a horizontal axis, and wherein said pivotally mounted means comprises a bell crank lever, one arm of which mounts the armature of magnetic material and the other arm of which is formed as the index pointer for cooperation with the second named scale.

6. Apparatus in accordance with claim 1, wherein the permanently magnetized portion of the floating element is non-circular and is magnetized so that one pole of the magnet is located on a part of said element adapted closely to approach the inside of the tube in the normal operation thereof and the opposite pole of the magnet is disposed at a relatively greater distance from the inside of the tube, and additional magnetic means to effect rotation of said floating element inside the tube so as to present the first named pole thereof in a direction toward said armature.

7. Apparatus in accordance with claim 1, wherein said armature and the permanently magnetized floating element have portions adapted to point toward one another which are formed as knife edges to increase the accuracy in the positioning of said armature by said permanently magnetized floating element.

8. Apparatus for the precise determination of the level of a column of mercury contained in a glass tube and having a vertical scale associated therewith, comprising an element constructed and arranged to float on the mercury in said tube and having a portion at least thereof of non-circular horizontal contour and permanently magnetized, one of the poles of this permanently magnetized portion being on a part thereof adapted to be positioned closely adjacent to the inside of the tube and the other pole being located at a relatively greater distance from the inside of the tube, and said first portion being formed as a substantially horizontal knife edge, a supporting member slidably mounted outside said tube for manual positioning and movement therealong, an index member carried by said supporting member and cooperable with said scale, means mounted in anti-friction bearings for rotation about a horizontal axis in said supporting member and carrying an armature of magnetic material cooperable with said permanently magnetized portion of the floating element, an index pointer rigid with said armature, a second scale carried by said supporting member with which said index pointer is visually cooperable, said armature having the portion thereof remote from said axis and which is adapted to be directed toward the outside of said tube formed as a horizontal knife edge, and a permanent magnet carried by said supporting member and having one pole thereof arranged to cause rotation of said permanently magnetized portion of the floating element about a vertical axis to orient the first named pole thereof to a position adjacent to said armature and further to oppose the attraction between said permanently magnetized element and said armature which might tend to cause friction between said floating element and the walls of said tube.

CHARLES F. WALLACE.